United States Patent
Bennett

(10) Patent No.: US 6,763,153 B2
(45) Date of Patent: Jul. 13, 2004

(54) APPARATUS AND METHOD FOR ELECTRONIC RIN REDUCTION IN FIBER-OPTIC SENSORS UTILIZING FILTER WITH GROUP DELAY

(75) Inventor: Sidney M. Bennett, Chicago, IL (US)

(73) Assignee: KVH Industries, Inc., Middletown, RI (US)

(*) Notice: Subject to any disclaimer, the term of this patent is extended or adjusted under 35 U.S.C. 154(b) by 227 days.

(21) Appl. No.: 10/124,186

(22) Filed: Apr. 17, 2002

(65) Prior Publication Data

US 2003/0198424 A1 Oct. 23, 2003

(51) Int. Cl.[7] .............. G02B 6/00; G01J 1/04; G01J 1/42
(52) U.S. Cl. .................. 385/12; 250/227.14
(58) Field of Search ............ 385/12–14; 250/227.11, 250/227.12, 227.14, 227.16; 356/460–465; 340/555–557, 566

(56) References Cited

U.S. PATENT DOCUMENTS

| | | | |
|---|---|---|---|
| 4,410,275 A | * 10/1983 | Shaw et al. | 356/460 |
| 4,571,650 A | 2/1986 | Ojima et al. | |
| 4,603,931 A | 8/1986 | Ruffman | |
| 4,615,582 A | 10/1986 | Lefevre et al. | |
| 4,630,229 A | 12/1986 | D'Hondt | |
| 4,630,890 A | 12/1986 | Ashkin et al. | |
| 4,637,722 A | 1/1987 | Kim | |
| 4,668,264 A | 5/1987 | Dyott | |
| 4,669,814 A | 6/1987 | Dyott | |
| 4,697,876 A | 10/1987 | Dyott | |
| 4,705,399 A | 11/1987 | Graindorge et al. | 356/350 |
| 4,712,866 A | 12/1987 | Dyott | |
| 4,733,938 A | 3/1988 | Lefevre et al. | |
| 4,735,506 A | * 4/1988 | Pavlath | 356/464 |

(List continued on next page.)

FOREIGN PATENT DOCUMENTS

| | | |
|---|---|---|
| DE | 33 05 104 A1 | 8/1984 |
| DE | 36 15 305 A1 | 11/1987 |
| DE | 37 42 201 A1 | 6/1989 |
| EP | 0 551 874 A2 | 7/1993 |
| EP | 0 586 242 A1 | 3/1994 |
| EP | 0 686 867 A1 | 12/1995 |
| EP | 0 722 081 A2 | 7/1996 |
| EP | 856 737 A1 | 8/1998 |
| EP | 0 871 009 A1 | 10/1998 |
| EP | 0 872 756 A1 | 10/1998 |
| FR | 2 535 463 A | 5/1984 |
| JP | 07209398 | 8/1995 |
| WO | WO98/58268 A | 12/1998 |
| WO | WO00/36425 | 6/2000 |

OTHER PUBLICATIONS

US 6,208,775, 3/2001, Dyott (withdrawn).
Alekseev et al; "Fiber Optic Gyroscope With Suppression of Excess Noise From the Radiation Source", Technical Physical Letters, 24(9): 719–721, (Sep. 1998).

(List continued on next page.)

*Primary Examiner*—Sandra O'Shea
*Assistant Examiner*—Peter Macchiarolo
(74) *Attorney, Agent, or Firm*—Foley Hoag, LLP

(57) ABSTRACT

The invention is directed to an apparatus and a method for reducing noise, in particular RIN noise, in optical sensors, in particular fiber-optic sensors. The optical sensor produces a sensor output signal representing a physical quantity to be measured and also contains a first noise component, which is detected by a first detector. A separate detector detects an input light noise component of the input light source of the optical sensor and produces a second noise component. The second noise component is electronically processed and time-delayed by a filter by a time delay which substantially corresponds to the time delay experienced by the sensor input light traversing the optical sensor. The time-delayed processed signal is then subtracted from the sensor output signal to produce a reduced noise optical sensor signal corresponding to the measured physical quantity.

19 Claims, 3 Drawing Sheets

U.S. PATENT DOCUMENTS

| | | |
|---|---|---|
| 4,740,085 A | 4/1988 | Lim |
| 4,755,021 A | 7/1988 | Dyott |
| 4,765,739 A | 8/1988 | Koizumi et al. |
| 4,776,700 A | 10/1988 | Frigo |
| 4,796,993 A | 1/1989 | Sonobe et al. |
| 4,815,817 A | 3/1989 | Levinson |
| 4,842,409 A | 6/1989 | Arditty et al. |
| 4,848,910 A | 7/1989 | Dupraz |
| 4,883,358 A | 11/1989 | Okada |
| 4,887,900 A | 12/1989 | Hall |
| 4,943,132 A | 7/1990 | Huang |
| 5,012,088 A * | 4/1991 | Cole et al. ............. 250/227.19 |
| 5,020,912 A * | 6/1991 | Pavlath ...................... 356/464 |
| 5,033,854 A | 7/1991 | Matthews et al. |
| 5,048,962 A | 9/1991 | Kurokawa et al. |
| 5,056,919 A | 10/1991 | Arditty et al. ............... 356/350 |
| 5,074,665 A | 12/1991 | Huang et al. |
| 5,080,489 A | 1/1992 | Nishikawa et al. |
| 5,096,312 A | 3/1992 | Huang |
| 5,106,193 A | 4/1992 | Fesler et al. |
| 5,133,600 A | 7/1992 | Schröder |
| 5,135,555 A | 8/1992 | Coyle, Jr. et al. |
| 5,148,236 A | 9/1992 | Blake et al. ................. 356/350 |
| 5,289,257 A | 2/1994 | Kurokawa et al. |
| 5,289,258 A | 2/1994 | Szafraniec et al. |
| 5,331,404 A | 7/1994 | Moeller et al. |
| 5,351,123 A | 9/1994 | Spahlinger |
| 5,355,208 A * | 10/1994 | Crawford et al. .......... 356/35.5 |
| 5,359,413 A | 10/1994 | Chang et al. |
| 5,365,338 A | 11/1994 | Bramson |
| 5,412,471 A | 5/1995 | Tada et al. |
| 5,457,532 A | 10/1995 | August et al. ............... 356/350 |
| 5,459,575 A | 10/1995 | Malvern |
| 5,469,257 A | 11/1995 | Blake et al. |
| 5,469,267 A | 11/1995 | Wang |
| 5,471,301 A * | 11/1995 | Kumagai et al. ............ 356/460 |
| 5,475,772 A | 12/1995 | Hung et al. .................... 385/11 |
| 5,493,396 A | 2/1996 | Sewell |
| 5,500,909 A | 3/1996 | Meier |
| 5,504,684 A | 4/1996 | Lau et al. |
| 5,513,003 A | 4/1996 | Morgan ...................... 356/350 |
| 5,552,887 A | 9/1996 | Dyott |
| 5,559,908 A | 9/1996 | August et al. |
| 5,602,642 A * | 2/1997 | Bergh et al. ................. 356/464 |
| 5,644,397 A | 7/1997 | Blake |
| 5,654,906 A | 8/1997 | Youngquist |
| 5,655,035 A | 8/1997 | Burmenko |
| 5,682,241 A | 10/1997 | Mark et al. |
| 5,696,858 A | 12/1997 | Blake .......................... 385/12 |
| 5,701,177 A | 12/1997 | Kumagai et al. |
| 5,701,376 A | 12/1997 | Shirasaki |
| 5,767,509 A | 6/1998 | Cordova et al. |
| 5,781,675 A | 7/1998 | Tseng et al. |
| 5,854,864 A | 12/1998 | Knoesen et al. |
| 5,898,496 A | 4/1999 | Huang et al. |
| 5,946,097 A | 8/1999 | Sanders et al. |
| 5,953,121 A | 9/1999 | Bohnert et al. |
| 5,987,195 A | 11/1999 | Blake |
| 6,023,331 A | 2/2000 | Blake et al. |
| 6,025,915 A | 2/2000 | Michal et al. |
| 6,047,095 A | 4/2000 | Knoesen et al. |
| 6,075,915 A | 6/2000 | Koops et al. |
| 6,148,131 A | 11/2000 | Geertman |
| 6,163,632 A | 12/2000 | Rickman et al. |
| 6,185,033 B1 | 2/2001 | Bosc et al. |
| 6,188,811 B1 | 2/2001 | Blake .......................... 385/12 |
| 6,233,371 B1 | 5/2001 | Kim et al. |
| 6,301,400 B1 | 10/2001 | Sanders |
| 6,307,632 B1 | 10/2001 | Blake ........................... 356/477 |
| 6,351,310 B1 | 2/2002 | Emge et al. |
| 6,356,351 B1 | 3/2002 | Blake .......................... 356/483 |
| 6,370,289 B1 | 4/2002 | Bennett |
| 6,434,285 B1 | 8/2002 | Blake et al. .................... 385/12 |
| 6,535,654 B1 | 3/2003 | Goettsche et al. ............ 385/11 |

OTHER PUBLICATIONS

Blake et al., "In–Line Sagnac Interferometer Current Sensor," *IEEE*, pp. 116–121 (1995).

Blake and Szafraniec, "Random Noise in PM and Depolarized Fiber Gyros", OSA Symposium Proceedings, 1997, OWB2, pp. 122–125.

Bohnert, et al., "Field Test of Interferometric Optical Fiber High–Voltage and Current Sensors" *SPIE,* vol. 2360 pp. 16–19 (Feb. 1994).

Bohnert, et al., "Temperature and Vibration Insenstitive Fiber–Optic Current Sensor" *ABB,* vol. 2360 pp 336–339 (Feb. 1994).

Burns, et al., "Excess Noise in Fiber Gyroscope Sources", IEEE Photonics Technology Letter, vol. 2, No. 8, Aug. 1990, pp. 606–608.

Clark et al., "Application of a PLL and ALL Noise Reduction Process in Optical Sensing System," *IEEE Translations on Industrial Electronics,* vol. 44, No. 1, Feb. 1997, pp. 136–138.

Dagenais et al., "Low–Frequency Intensity Noise Reduction for Fiber–Optic Sensor Applications," *Optical Fiber Sensors Conference,* Jan. 29–31, 1992, pp. 177–180.

Dupraz, J.P., "Fiber–Optic Interferometers for Current Measurement: Principles and Technology", Alsthom Review No. 9: 29–44 (Dec. 1987).

Frosio, G. and Dändliker, "Reciprocal Reflection Interferometer for a Fiber–Optic Faraday Current Sensor", Applied Optics 33 (25): 6111–6122 (Sep. 1, 1994).

Gronau Yuval et al., "Digital Signal Processing For An Open–Loop Fiber–Optic Gyroscope", Applied Optics, Optical Society of America, Washington, U.S., vol. 34, No. 25, Sep. 1, 1995, pp. 5849–5853.

Killian M. Kevin; "Pointing Grade Fiber Optic Gyroscope", IEEE AES Systems Magazine, pp. 6–10 (Jul. 1994).

LaViolette and Bossler: "Phase Modulation Control for An Interferometric Fiber Optic Gyroscope", IEEE Plan 90, Position Location and Navigation Symposium, Las Vegas, (Mar. 20–23, 1990).

Lefevre, "The Fiber–Optic Gyroscope", Artech House, Boston, pp. 29–30 (1993).

McCallion and Shimazu; "Side–Polished Fiber Provides Functionality and Transparency", Laser Focus World, 34 (9): S19–S24, (Sep. 1, 1998).

Moeller and Burns, "1.06mm All–fiber Gyroscope with Noise Subtraction, Proccedings of the Conference on Optical Fiber Sensors", IEEE–OSA, Monterey, CA, 1992, pp. 82–85.

Moeller and Burns, "Observation of Thermal Noise in a Dynamically Biased Fiber–Optic Gyro", Optical Letters, 1996, vol. 21, pp. 171–173.

Nikos Drakos, "Circular Polarization States for Light, and Quarter–Wave Plates," *Computer Based Learning Unit, University of Leeds* (Mar. 2, 1998).

Ono et al.; "A Small–Sized, Compact, Open–loop Fibre–Optic Gyroscope with Stabilized Scale Factor", Meas. Sci. Technol. 1: 1078–1083, (1990.

Polynkin et al.; "All–Optical Noise–Subtraction Scheme for a Fiber–Optic Gyroscope", Optics Letters, 25(3): 147–149, (Feb. 1, 2000).

Rabelo et al.; "SNR Enhancement of Intensity Noise–Limited FOGs", Journal of Lightwave Technology 18(12):2146–2150 (Dec. 2000).

Short, S. et al., "Elimination of Birefringence Induced Scale Factor Errors in the In–Line Sagnac Interferometer Current Sensor", Journal of Lightwave Technology 16(10): 1844–1850 (Oct. 1998).

* cited by examiner

APPARATUS AND METHOD FOR ELECTRONIC RIN REDUCTION IN FIBER-OPTIC SENSORS UTILIZING FILTER WITH GROUP DELAY

RELATED APPLICATIONS

This application incorporates by reference the disclosure of U.S. Pat. No. 6,370,289, issued on Apr. 9, 2002.

FIELD OF THE INVENTION

The invention relates to fiber-optic sensors, in particular fiber-optic gyroscopes and fiber-optic sensors that measure magnetic fields.

BACKGROUND OF THE INVENTION

Fiber-optic sensors can be used to measure various physical quantities, such as the rotation of an object (fiber-optic gyroscope) or magnetic fields arising from currents in the vicinity of the sensor (fiber-optic current sensor). Such fiber-optic sensors typically include a section of optical fiber that is coupled to a broadband source, such as a laser operated below threshold, a superluminescent diode (SLD) or a fiber superluminescent source, a coupler to couple optical radiation emitted by the broadband source into the fiber, preferably a fiber coil, at least one polarizer and at least one phase modulator, and a detector which detects a phase shift or polarization difference between the optical signals traversing the fiber. The phase or polarization shift between the optical signals may be introduced, for example, by the rotation of the fiber coil or by a magnetic field. The term fiber-optic sensor will be used hereinafter to refer to both fiber-optic gyroscopes and fiber-optic current sensors.

The electrical output signal of a fiber-optic sensor includes noise components arising from various sources. The output noise which tends to manifest itself as angle random walk (ARW), as defined, for example, in IEEE Std-528, Inertial Sensor Terminology (incorporated by reference herein), has a different functional dependence on the optical power at the photodetector input, depending on the origin of the noise component. For example, thermal noise generated in the transimpedance amplifier feedback resistor in the photodetector electronics is independent of the light power. Shot noise related to the quantized nature of the detector current can be shown to be proportional to the square root of optical power, whereas relative intensity noise (RIN), which is inherent in the light of the source due to its finite bandwidth and impinges on the photodetector, and flicker noise (1/f), are proportional to the optical power. Since RIN and flicker noise have the same functional dependence on optical power, the term RIN hereinafter refers to both RIN and flicker noise.

RIN causes the noise-related performance of fiber-optic sensor systems to saturate, rather than continue to improve, as the source power is increased. Unless RIN can be mitigated, there exists a power level beyond which no further practical improvement is possible. For example, EDFS (Erbium doped fiber sources) which, due to their high optical power and wavelength stability, are often considered the natural choice for high performance fiber-optic sensors, tend to have a high RIN. Superluminescent diodes (SLD's), on the other hand, tend to have a lower RIN due to their larger bandwidth, but may suffer from limitations in power and lifetime, limiting their utility.

In one approach described in U.S. Pat. No. 5,331,404 and illustrated in FIG. 1, RIN in fiber-optic sensors is reduced by coupling a fraction of the light emitted by a light source 19 into a "dummy" fiber 30 having substantially the same length as the fiber 22 of the fiber-optic sensor 5. The output signal detected at the end of the "dummy" fiber 30 by detector 34 is then modulated in multiplier 36 by a replica of the signal output of the fiber optic sensor 5 detected by detector 32 and subtracted in subtractor 38 from the output signal of the fiber-optic sensor 5 detected by detector 32 after passing through AC coupled amplifiers 40, 42 with suitable adjustment of the channel gains. In other words, the "dummy" fiber 30 in this case operates as an analog delay line to match the time delay experienced by the light traversing the fiber-optic sensor 5. This approach, however, requires a second coil of fiber of approximately the same length as the fiber-optic sensor coil.

In another approach disclosed in U.S. Pat. No. 5,655,035, two fiber-optic sensors can be excited by the same optical source, but with the sensitive axes oriented in diametrically opposed directions. The detected outputs are added, thereby subtracting the RIN, which is common to both channels since it arises in the common source. This approach doubles the entire fiber-optic sensor optical component count (except for the light source), which is expensive and bulky.

In another approach, described in U.S. Pat. No. 6,370,289 issued to Bennett, light from a light source is coupled into an input coupler with a first portion of the light emerging from the input coupler being transmitted to and through a first polarizer and a sensor which contains a fiber coil and other appropriate components. A detector and amplifier is coupled to a return tap of the input coupler and measures a sensor signal after the first portion of the light has transited through the sensor coil and other components. The sensor signal includes, in addition to the desired sensor signal, among others, the RIN noise. A second portion of the light emerging from the unused tap of the input coupler is transmitted through a second polarizer having a polarization axis substantially parallel to that of the first polarizer and is detected by a second detector and amplifier. This detected second portion of the light represents the RIN noise (as well as other incoherent noise sources). The RIN noise sample is delayed in a delay unit whose bandwidth is larger than the detector bandwidth, so that the time delay is essentially constant across the bandwidth where noise cancellation is desired and the sensor signal is present. The delay unit can be either analog delay line or implemented digitally in a shift register or in a computer memory buffer. The RIN noise sample is then multiplied by the waveform of the sensor signal. The sensor signal can also be passed through a DC block to eliminate the DC component of the sensor signal prior to the subtraction. The multiplied RIN noise sample is then subtracted from the sensor signal. The resulting time-dependent waveform having a reduced RIN component can then be processed further. According to another embodiment of the Bennett Patent, the RIN sample signal may be sampled at a rear facet of the light source.

The Bennett Patent approach, while having many advantages over the prior art, requires the use of a delay unit which can be, e.g., either analog delay line or implemented digitally in a shift register or in a computer memory buffer. It may be advantageous, however, to avoid the use of such components and implement the RIN noise reduction using other means to delay the RIN noise signal.

In addition, P. Polynkin, J. deArruda and J. Blake in "All-optical noise-subtraction scheme for a fiber optic gyroscope" in Opt. Lett, Vol. 25, No. 3, pp-147–149, Feb. 1, 2000 describe a method which eliminates the need to delay the source signal, and performs the noise cancellation optically.

They have shown that the source noise signal and the noise on the sensor signal have the same form at the optical detector for a closed-loop gyro with square wave modulation (except that they are out of phase), if the gains (losses) in each path are the same and the modulation frequency is the so-called "proper frequency", which is equal to $$f_p=1/(2\tau)$$

where $\tau$ is the transit time of the light though the sensor. The optical signals are imaged on the same detector with the resultant noise cancellation occurring in the detection process.

However, there are some practical difficulties with this technique, as the relative amplitude of the two optical signals is fixed at the time of manufacture, and it is known that the loss in the optical circuit changes with temperature. Also, since there is no provision for multiplying the source signal by the replica of the sensor signal, this method is only appropriate for closed-loop gyros where the output signal is nulled. In addition, the approach only works if the modulation frequency is the proper frequency.

The latter restriction is certainly a limitation for open-loop gyros where the modulation frequency is often a small fraction of the proper frequency.

It would therefore be desirable to provide a fiber-optic sensor that used a filter to delay the RIN noise signal.

SUMMARY OF THE INVENTION

The invention is directed to an apparatus and a method for reducing noise, in particular RIN noise, in fiber-optic sensors.

An optical sensor system and method for producing a sensor signal having reduced noise comprises an optical sensor adapted to receive a sensor input light and adapted to measure a physical quantity, with the optical sensor producing a sensor output signal corresponding to the physical quantity and a first noise component, a first detector which detects the sensor output signal, a second detector which detects the sensor input light corresponding to a second noise component, a high pass filter or DC block coupled to the second detector, a filter with a group delay substantially corresponding to a time delay of the sensor input light traversing the optical sensor coupled to the high pass filter or DC block, a multiplier, which multiplies the filtered time-delayed second noise component with the sensor output signal, and a subtractor which subtracts the multiplied filtered time-delayed second noise component from the sensor output signal to produce the sensor signal having the reduced noise. The optical sensor may comprise an optical waveguide, which may be an integrated optical waveguide. The optical sensor may be a fiber-optic sensor. The physical quantity may be a rotation of the fiber-optic sensor or a magnetic field. The magnetic field may be produced by an electric current. An amplifier may adjust an amplitude and optionally a phase of the filtered time-delayed second noise component relative to a respective amplitude and optionally a phase of the sensor output signal. The sensor output signal may be amplified so as to suppress a DC component of the sensor output signal after the filtered time delayed second noise component is multiplied by the sensor output signal, and before the multiplied filtered time-delayed second noise component is subtracted from the sensor output signal. The second detector may be coupled to an input section of the fiber-optic sensor or to a rear facet of the light source.

Further features and advantages of the present invention will be apparent from the following description of certain embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed to an apparatus and a method for reducing noise, in particular RIN noise, in a fiber-optic sensor. In particular, the noise reduction system and method described herein can reduce RIN noise without the need for additional bulky fiber-optic components or unnecessary restriction on the sensor coil length or modulation frequency. The fiber-optic sensor of the present application uses a first detector to measure an output signal of a fiber-optic sensor and a second detector to measure a second signal which has not traversed the sensor optical path and represents a signature of the light source. The second signal is delayed with respect to the first signal and modulated by a replica of the sensor signal and subtracted from the first signal after suitable amplification.

Figure 1:
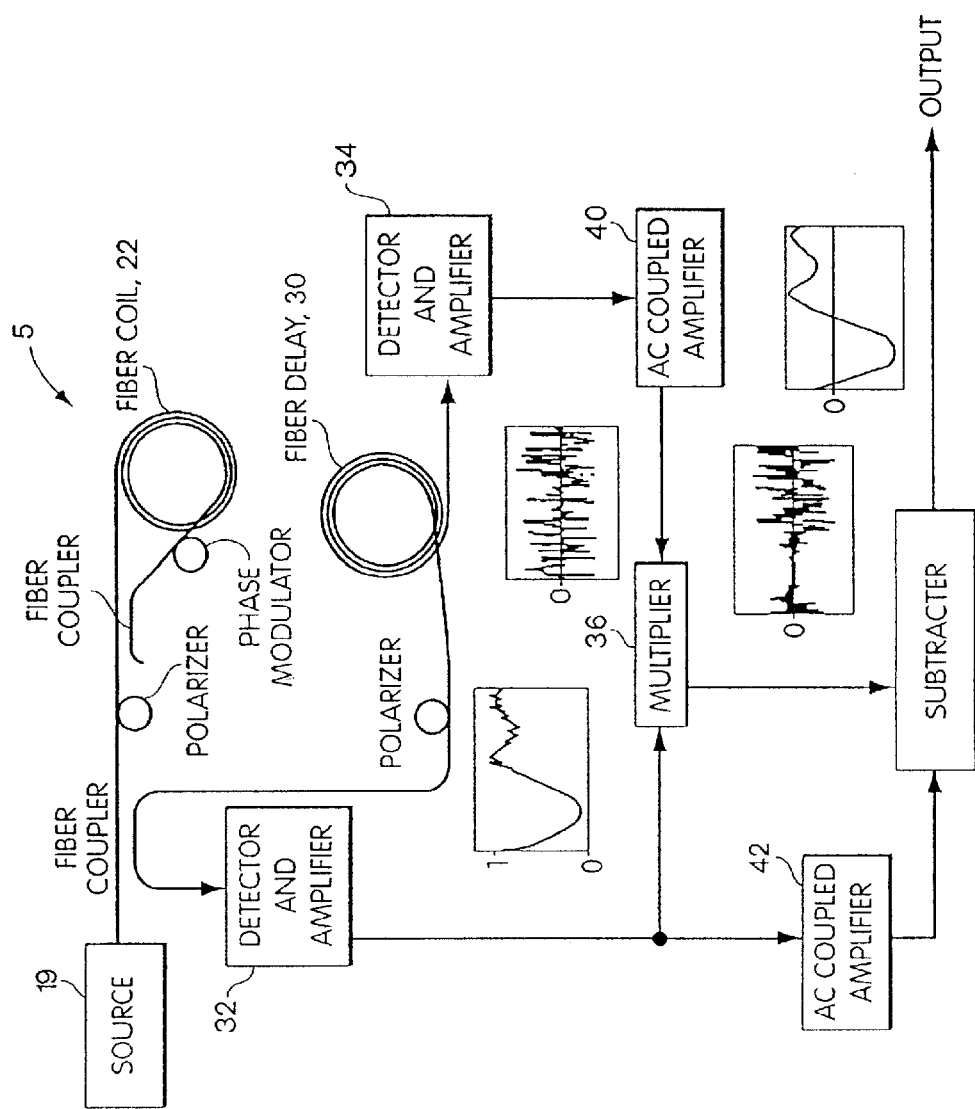
FIG. 1 shows a prior art current sensor.
Figure 2:
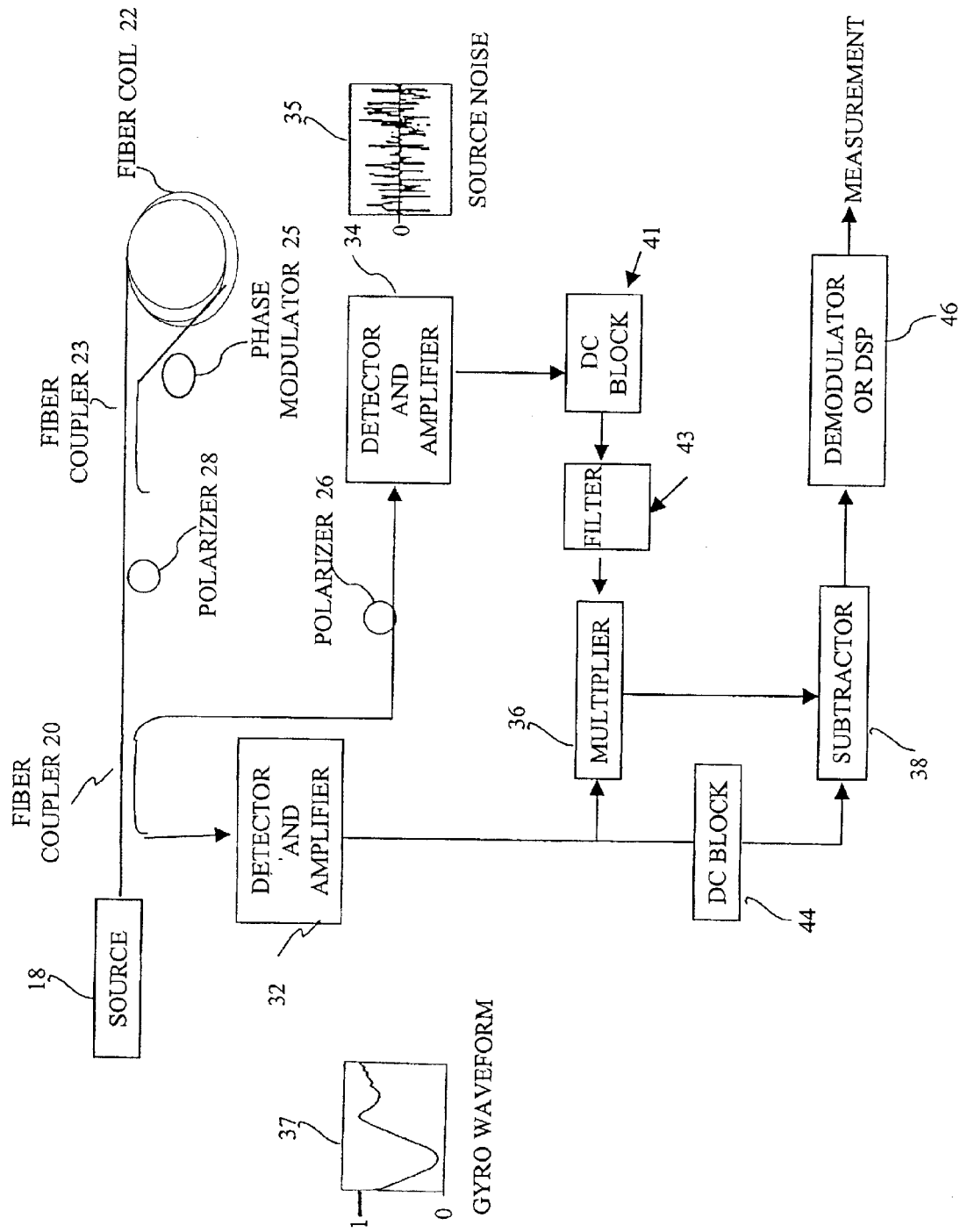
FIG. 2 shows a first embodiment of the fiber-optic sensor system according to the invention.

Referring now to FIG. 2, in a first embodiment light from a light source 18 is coupled into an input coupler 20, with a first portion of the light emerging from the input coupler 20 being transmitted through a first polarizer 28 to a second coupler 23 which launches two counter-propagating light beams into the respective ends of the fiber coil 22. The phase of these counter-propagating light beams is modulated by phase modulator 25. A detector and amplifier 32 is coupled to a return tap of fiber coupler 20 and measures the optical power of the interference light produced by an interference of the counter-propagating light beams combined in fiber coupler 23. The interference light includes, in addition to the desired sensor signal, among others, the RIN noise.

A second portion of the light emerging from the unused tap of input coupler 20 is transmitted through a second polarizer 26 having a polarization axis substantially parallel to that of the first polarizer 28 and detected by a second detector and amplifier 34. This detected second portion 35 of the light represents the RIN noise as well as the other incoherent noise sources mentioned above. The other noise sources are not included in the present discussion. The RIN (source noise) sample 35 is passed through a high pass filter, AC-coupled amplifier or DC block 41 and then delayed according to the method of the present invention as set forth in the following paragraph in filter 43. The delayed RIN noise sample 35 is then multiplied in multiplier 36 by the waveform 37 of the signal returned to the photodetector 32. The sensor signal can also be passed through a DC block 44 to eliminate the DC component of the sensor signal prior to the subtraction operation. The multiplied delayed RIN noise sample 35 is then subtracted from the fiber-optic sensor signal in subtractor 38. To improve the degree of cancellation, the gain of the two signal paths should be matched, taking into consideration losses in the sensor optical circuit. Generally, this can be done by comparing the noise powers in a frequency range that does not contain the sensor signal and then setting the noise powers in the two channels to be equal by adjusting the gain of detectors and amplifiers 32, 34. Also, the high pass filter or DC block 41 may be incorporated in an amplifier which may be used to appropriately adjust the signal amplitude. If phase information of the signal is also required, then the comparison could be done as a cross spectrum. The resulting time-dependent waveform having a reduced RIN component can then be processed further, for example, in a demodulator or digital signal processor 46 in a manner identical to that of a fiber-optic sensor signal that had not been subject to RIN cancellation.

According to the present invention, the RIN noise signal may be delayed as follows. The RIN cancellation may be achieved by inserting a filter 43 with nominally constant group delay characteristics in the RIN noise signal path, prior to multiplication by the sensor signal 37 in multiplier 36. The group delay is chosen to be equal to the transit time $\tau$ of the sensor signal 37 through the sensor. To a high order of accuracy this results in cancellation of the source RIN noise accompanying the sensor signal. The filter may be realized by conventional lumped constant electronic components, electronic filtering, or a digital filter.

Some imperfection in the constant group delay filter 43 can be tolerated, as the match only has to be precise within the detection bandwidth for the output component at the modulation frequency. The methods for adjusting for such minor mismatches have been previously described.

The required group delay may be determined according to the following calculation. $D_1(t)$ and $D_2(t)$ represent the sensor signal at the detector 32, and the RIN noise signal at the detector 34:

$$D_1(t) = R_1[I_o + n(t-\tau)]g(t)L_1$$

$$D_2(t) = R_2[I_o + n(t)]L_2,$$

where $R_1$ and $R_2$ are constants of proportionality, $I_o$ is the optical source intensity, $\tau$ is the time delay in the sensor optical circuit, $n(t-\tau)$ is the RIN noise intensity at detector 32 at time $t-\tau$, $n(t)$ is the RIN noise intensity at detector 34 at time $t$, $L_1$ is the loss in the sensor optical circuit, $L_2$ is the loss between the optical source and detector 34, and $g(t)$ represents the sensor signal:

$$g(t) = 1 + \cos[\phi_s + \phi_m \cos(\omega_m t)],$$

where $\phi_s$ is the phase shift in the sensor, $\phi_m$ is the modulation depth, and $\omega_m$ is the modulation frequency.

$D_2(t)$ is first passed through a high pass filter, AC-coupled amplifier or DC block 41 to remove the DC component:

$$D_{2HP}(t) = R_2 n(t) L_2$$

For simplicity, let $K_1 = R_1 L_1$ and $K_2 = R_2 L_2$. Then:

$$D_{2HP}(t) = K_2 n(t).$$

Now perform the multiplication of the RIN noise signal from detector 34, as passed through the high pass filter 41, by the sensor signal from detector 32:

$$D_1(t) D_{2HP}(t) = K_2 n(t) [K_1[I_o + n(t-\tau)]g(t)]$$

$$D_1(t) D_{2HP}(t) = K_1 K_2 g(t) [I_o n(t) + n(t) n(t-\tau)]$$

Now subtract this from the sensor signal from detector 32:

$$S = K_1[I_o + N(t-\tau)]g(t) - K_1 K_2 g(t)[I_o n(t) + n(t)n(t-\tau)]$$

$$= g(t)[K_1 I_o + K_1 n(t-\tau) - K_1 K_2 I_o n(t) - K_1 K_2 n(t) n(t-\tau)]$$

$K_1 I_o g(t)$ is the desired signal. The remainder of the terms are noise which is to be minimized.

$$0 = g(t)[K_1 n(t-\tau) - K_1 K_2 I_o n(t) - K_1 K_2 n(t-\tau)]$$

A sufficient condition is $$0 = [K_1 n(t-\tau) - K_1 K_2 I_o n(t) - K_1 K_2 n(t) n(t-\tau)]$$

But $n(t)n(t-\tau)$ is a second order term. Thus $$K_1 n(t-\tau) = K_1 K_2 I_o n(t)$$

$$n(t-\tau) = K_2 I_o n(t)$$

$K_2 I_o$ is a constant, $K$, so $$n(t-\tau) = K n(t)$$

In the frequency domain:

$$N(\omega) e^{-j\omega\tau} = K N(\omega), \text{ where}$$

$e^{-j\omega\tau}$ represents a linear phase shift which can be introduced by a finite impulse response filter. In effect this is a constant time delay whose magnitude is equal to that of the time delay in the optical circuit.

Since there may be filters in both detection outputs the criterion would be satisfied if the differential time delay between the filters met the stated criterion.

Figure 3:
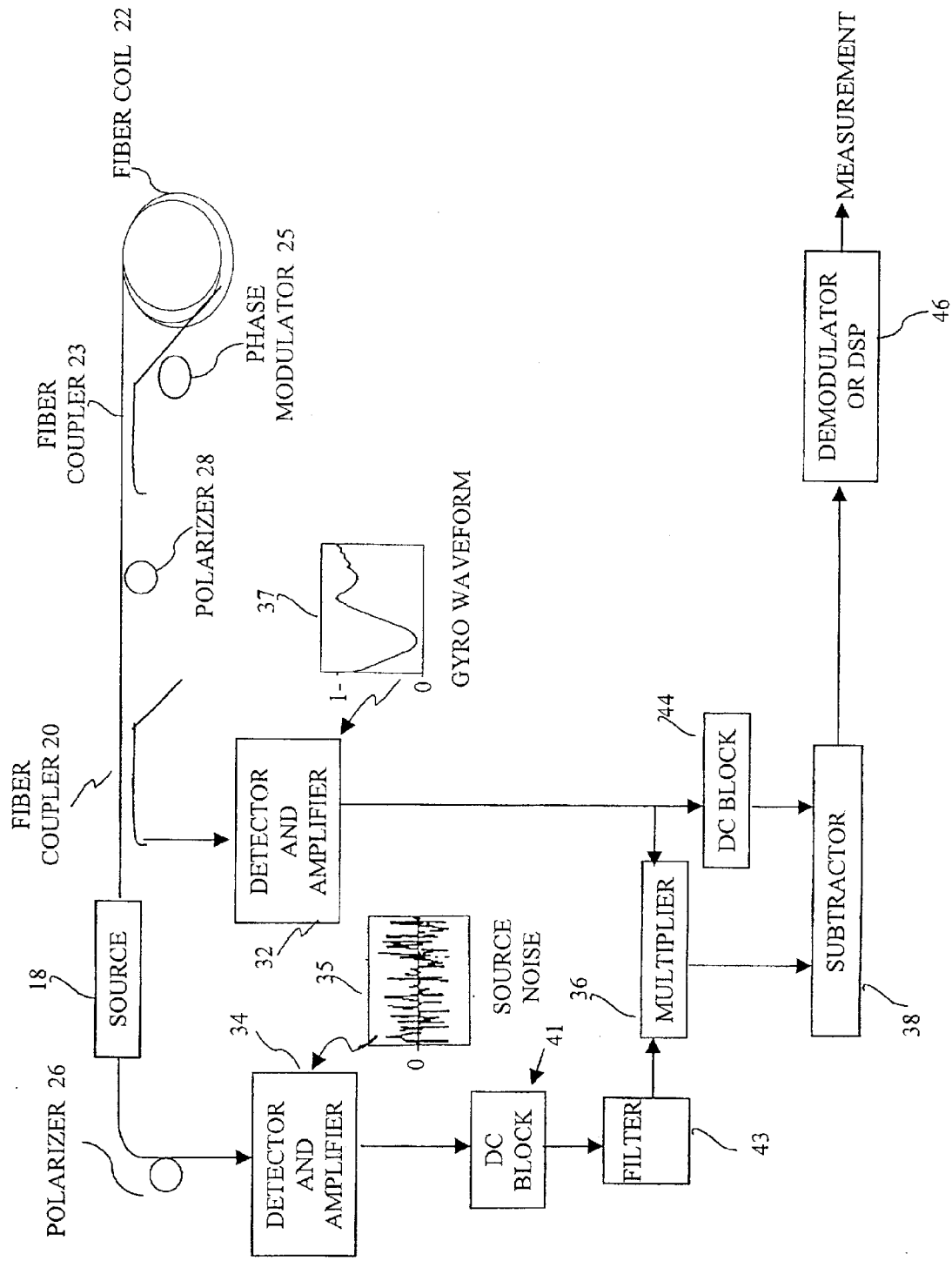
FIG. 3 shows a second embodiment of the fiber-optic sensor system according to the invention.

According to another embodiment illustrated in FIG. 3, the fiber-optic components are arranged in a similar fashion as those of the embodiment of FIG. 2, except that the RIN sample signal is sampled at a rear facet of the light source or laser 18 by detector 34 which is frequently incorporated to monitor the optical output power. This arrangement is best suited for application where the laser light is polarized. However, since the laser light is not likely to be polarized as well as light that has passed through a polarizer, the potential improvement in RIN is limited by the polarization of the laser source. Polarizer 26 may be employed if the laser light itself is not polarized.

It will be apparent to one of ordinary skill in the art that the above specific embodiments as illustrated in FIGS. 2 and 3 relate to a fiber optic gyroscope. However, it also will be apparent that the techniques described may equally be applied in connection with fiber optic current sensors.

While the invention has been disclosed in connection with the preferred embodiments shown and described in detail, various modifications and improvements thereon will become readily apparent to those skilled in the art. For example, the same noise reduction concept can also be applied to an interferometric fiber optic magnetic field and/or electric current sensor based on the Faraday effect which may be implemented as a continuous loop or in a reflective polarimetric configuration. In a current sensor, $\lambda/4$ wave plates are inserted between the source and the fiber coil to produce counter-propagating light beams with opposite circular polarization directions. These sensors can be analyzed in the same fashion as the interferometric fiber-optic gyro, since the signal processing is analogous.

Furthermore, the fiber optic sensors need not be implemented as fibers, but may be made of optical waveguides which may be formed on and/or integrated with a substrate.

Accordingly, the spirit and scope of the present invention is to be limited only by the following claims.

What is claimed is:

1. An optical sensor system for producing a sensor signal having reduced noise, comprising:
   an optical sensor adapted to receive a sensor input light and adapted to measure a physical quantity, with the optical sensor producing a sensor output signal corresponding to the physical quantity and a first noise component;
   a first detector which detects the sensor output signal;
   a second detector which detects the sensor input light corresponding to a second noise component;
   a high pass filter or DC block coupled to the second detector;
   a filter, with a group delay substantially corresponding to a time delay of the sensor input light traversing the optical sensor, coupled to the high pass filter or DC block,
   a multiplier, which multiplies the filtered time-delayed second noise component with the sensor output signal, and
   a subtractor which subtracts the multiplied filtered time-delayed second noise component from the sensor output signal to produce the sensor signal having the reduced noise.

2. The optical sensor system of claim 1, wherein the optical sensor comprises an optical waveguide.

3. The optical sensor system of claim 2, wherein the optical waveguide is an integrated optical waveguide.

4. The optical sensor system of claim 1, wherein the optical sensor is a fiber-optic sensor.

5. The optical sensor system of claim 4, wherein the physical quantity is a rotation of the fiber-optic sensor.

6. The optical sensor system of claim 4, wherein the physical quantity is a magnetic field.

7. The optical sensor system of claim 6, wherein the magnetic field is produced by an electric current.

8. The optical sensor system of claim 4, further comprising an amplifier which adjusts an amplitude and optionally a phase of the filtered time-delayed second noise component relative to a respective amplitude and optionally a phase of the sensor output signal.

9. The optical sensor system of claim 4, wherein the sensor output signal is amplified so as to suppress a DC component of the sensor output signal after the filtered time-delayed second noise component is multiplied by the sensor output signal, and before the multiplied filtered time-delayed second noise component is subtracted from the sensor output signal.

10. The optical sensor system of claim 4, wherein the second detector is coupled to an input section of the fiber-optic sensor.

11. The optical sensor system of claim 4, wherein the second detector is coupled to a rear facet of the light source.

12. A method of producing a measurement signal having reduced noise from a fiber-optic sensor, comprising:
    measuring a sensor output signal containing the measurement signal and a first noise component;
    measuring an input light noise component of a fiber-optic sensor input light representing a second noise component;
    filtering the second noise component through a high pass filter or DC block;
    filtering the second noise component through a filter having a group delay substantially corresponding to a sensor time delay of the fiber-optic sensor input light traversing the fiber-optic sensor;
    multiplying the filtered time-delayed second noise component with the sensor output signal; and
    subtracting the multiplied filtered time-delayed second noise component from the sensor output signal to produce the reduced noise measurement signal.

13. The method according to claim 12, wherein the measurement signal represents a response of the fiber-optic sensor to a rotation of the fiber-optic sensor.

14. The method according to claim 12, wherein the measurement signal represents a response of the fiber-optic sensor to a magnetic field.

15. The method according to claim 14, wherein the magnetic field is produced by an electric current.

16. The method according to claim 12, wherein the input light noise component is detected at a detector coupled to an input section of the fiber-optic sensor.

17. The method according to claim 12, wherein the input light noise component is detected at a rear facet of a light source.

18. The method according to claim 12, wherein the sensor output signal is amplified so as to suppress a DC component of the sensor output signal after the filtered time-delayed second noise component is multiplied by the sensor output signal, and before the multiplied filtered time-delayed second noise component is subtracted from the sensor output signal.

19. The method according to claim 12, wherein an amplitude and optionally a phase of the filtered time-delayed second noise component is adjusted relative to a respective amplitude and optionally a phase of the sensor output signal by comparing the second noise component and the sensor output signal in a spectral region where no measurement signal is produced by the fiber optic sensor.

* * * * *